US007224673B1

(12) United States Patent
Leung et al.

(10) Patent No.: US 7,224,673 B1
(45) Date of Patent: May 29, 2007

(54) MOBILE IP REGISTRATION MESSAGE COMPRESSION

(75) Inventors: Kent K. Leung, Mountain View, CA (US); Alpesh Patel, Santa Clara, CA (US)

(73) Assignee: Cisco Technology, Inc., San Jose, CA (US)

( * ) Notice: Subject to any disclaimer, the term of this patent is extended or adjusted under 35 U.S.C. 154(b) by 1042 days.

(21) Appl. No.: 10/156,225

(22) Filed: May 24, 2002

(51) Int. Cl.
   *H04Q 7/00* (2006.01)
(52) U.S. Cl. ....................................... 370/328; 370/349
(58) Field of Classification Search ................ 370/338, 370/349, 230; 709/203, 227, 242
   See application file for complete search history.

(56) References Cited

U.S. PATENT DOCUMENTS

| | | | | |
|---|---|---|---|---|
| 6,377,982 B1 * | 4/2002 | Rai et al. | ..................... | 709/217 |
| 6,567,664 B1 * | 5/2003 | Bergenwall et al. | ........ | 455/403 |
| 6,654,808 B1 * | 11/2003 | Chuah | ........................ | 709/227 |
| 6,711,147 B1 * | 3/2004 | Barnes et al. | ............... | 370/338 |
| 6,862,274 B1 * | 3/2005 | Tsao et al. | ................... | 370/338 |
| 2002/0138565 A1 * | 9/2002 | Kustov et al. | .............. | 709/203 |
| 2003/0074452 A1 * | 4/2003 | Zheng et al. | ............... | 709/228 |

OTHER PUBLICATIONS

Calhoun et al. (RFC 2794—Mobile IP Network Access Idendner Extension for IPv4).*
V. Jacobson, RFC 1144, "*Compressing TCP/IP Headers for Low-Speed Serial Links*", Feb. 1990, 39 pages.
S. Hanks, RFC 1701, "*Generic Routing Encapsulation (GRE)*", Oct. 1994, 7 pages.
C. Perkins, RFC 2003, "*IP Encapsulation within IP*", Oct. 1996, 12 pages.
C. Perkins, RFC 2004, "*Minimal Encapsulation within IP*", Oct. 1996, 6 pages.
B. Aboba, RFC 2486, "*The Network Access Identifier*", Jan. 1999, 6 pages.
P. Calhoun, RFC 2794, "*Mobile IP Network Access Identifier Extension for IPv4*", Mar. 2000, 7 pages.
G. Dommety, RFC 3115, "*Mobile IP Vendor/Organization-Specific Extensions*", Apr. 2001, 7 pages.
C. Perkins, RFC 3220, "*IP Mobility Support for IPv4*", Jan. 2002, 76 pages.
C. Bormann, RFC 3241, "*Robust Header Compression (ROHC) Over PPP*", Apr. 2002, 10 pages.

(Continued)

*Primary Examiner*—Hassan Kizou
*Assistant Examiner*—Salman Ahmed
(74) *Attorney, Agent, or Firm*—Beyer Weaver LLP

(57) ABSTRACT

Methods and apparatus for compressing registration request and reply messages are disclosed. A compressed registration request is sent by a Mobile Node to a Foreign Agent or a Home Agent (in the case of a co-located care-of address). Communication with the Mobile Node is performed using compressed registration messages, while communication between a Foreign Agent and Home Agent is performed using standard registration request and reply formats. Thus, when a Foreign Agent receives a compressed registration request, it expands the registration request and sends it to the Home Agent for processing. Upon receipt of the registration reply from the Home Agent, the Foreign Agent compresses the registration reply and sends it to the Mobile Node. When a Mobile Node registers directly with the Home Agent via a co-located care-of address, the registration request and reply messages need not be expanded, since the Home Agent is capable of interpreting, processing and generating compressed registration messages.

53 Claims, 7 Drawing Sheets

OTHER PUBLICATIONS

L-E. Jonsson, RFC 3242, "*RObust Header Compression (ROHC): A Link-Layer Assisted Profile for IP/UDP/RTP*", Apr. 2002, 17 pages.

C. Perkins, RFC 3344, "*IP Mobility Support for IPv4*", Aug. 2002, 77 pages.

L-E. Jonsson, RFC 3843, "*Robust Header Compression (ROHC): A Compression Profile for IP*", Jun. 2004, 12 pages.

* cited by examiner

```
 0                   1                   2                   3
 0 1 2 3 4 5 6 7 8 9 0 1 2 3 4 5 6 7 8 9 0 1 2 3 4 5 6 7 8 9 0 1
|   Type  404   |   Code   406  |         Lifetime   408        |
|                     Home Address    410                       |
|                     Home Agent      412                       |
|                                                               |
|                     Identification  414                       |
|                                                               |
| Extensions        . . .  416
```

```
                                                          602
 0                   1                   2                   3
 0 1 2 3 4 5 6 7 8 9 0 1 2 3 4 5 6 7 8 9 0 1 2 3 4 5 6 7 8 9 0 1
|   Type  404   |            NAI Index              604         |
| Other Extensions  . . .  416
```

MOBILE IP REGISTRATION MESSAGE COMPRESSION

BACKGROUND OF THE INVENTION

1. Field of the Invention

The present invention relates to Mobile IP network technology. More particularly, the present invention relates to enabling dynamic Home Agent assignment in Mobile IP using a cluster of Home Agents.

2. Description of the Related Art

Mobile IP is a protocol which allows laptop computers or other mobile computer units (referred to as "Mobile Nodes" herein) to roam between various sub-networks at various locations—while maintaining internet and/or WAN connectivity. Without Mobile IP or related protocol, a Mobile Node would be unable to stay connected while roaming through various sub-networks. This is because the IP address required for any node to communicate over the internet is location specific. Each IP address has a field that specifies the particular sub-network on which the node resides. If a user desires to take a computer which is normally attached to one node and roam with it so that it passes through different sub-networks, it cannot use its home base IP address. As a result, a business person traveling across the country cannot merely roam with his or her computer across geographically disparate network segments or wireless nodes while remaining connected over the internet. This is not an acceptable state-of-affairs in the age of portable computational devices.

To address this problem, the Mobile IP protocol has been developed and implemented. An implementation of Mobile IP is described in RFC 2002 of the IP Routing for Wireless/Mobile Hosts Working Group, C. Perkins, Ed., October 1996. Mobile IP is also described in the text "Mobile IP Unplugged" by J. Solomon, Prentice Hall. Both of these references are incorporated herein by reference in their entireties and for all purposes.

The Mobile IP process and environment are illustrated in FIG. 1. As shown there, a Mobile IP environment 2 includes the internet (or a WAN) 4 over which a Mobile Node 6 can communicate remotely via mediation by a Home Agent 8 and a Foreign Agent 10. Typically, the Home Agent and Foreign Agent are routers or other network connection devices performing appropriate Mobile IP functions as implemented by software, hardware, and/or firmware. A particular Mobile Node (e.g., a laptop computer) plugged into its home network segment connects with the internet through its designated Home Agent. When the Mobile Node roams, it communicates via the internet through an available Foreign Agent. Presumably, there are many Foreign Agents available at geographically disparate locations to allow wide spread internet connection via the Mobile IP protocol. Note that it is also possible for the Mobile Node to register directly with its Home Agent.

As shown in FIG. 1, Mobile Node 6 normally resides on (or is "based at") a network segment 12 which allows its network entities to communicate over the internet 4 through Home Agent 8 (an appropriately configured router denoted R2). Note that Home Agent 8 need not directly connect to the internet. For example, as shown in FIG. 1, it may be connected through another router (a router R1 in this case). Router R1 may, in turn, connect one or more other routers (e.g., a router R3) with the internet.

Now, suppose that Mobile Node 6 is removed from its home base network segment 12 and roams to a remote network segment 14. Network segment 14 may include various other nodes such as a PC 16. The nodes on network segment 14 communicate with the internet through a router which doubles as Foreign Agent 10. Mobile Node 6 may identify Foreign Agent 10 through various agent solicitations and agent advertisements which form part of the Mobile IP protocol. When Mobile Node 6 engages with network segment 14, it composes a registration request for the Home Agent 8 to bind the Mobile Node's current location with its home location. Foreign Agent 10 then relays the registration request to Home Agent 8 (as indicated by the dotted line "Registration"). During the registration process, the Home Agent and the Mobile Node 6 may then negotiate the conditions of the Mobile Node's attachment to Foreign Agent 10. For example, the Mobile Node 6 may request a registration lifetime of 5 hours, but the Home Agent 8 may grant only a 3 hour period. Therefore, the attachment may be limited to a period of time. When the negotiation is successfully completed, Home Agent 8 updates an internal "mobility binding table" which links the Mobile Node's current location via its care-of address (e.g., a collocated care-of address or the Foreign Agent's IP address) to the identity (e.g., home address) of Mobile Node 6. Further, if the Mobile Node 6 registered via a Foreign Agent, the Foreign Agent 10 updates an internal "visitor table" which specifies the Mobile Node address, Home Agent address, etc. In effect, the Mobile Node's home base IP address (associated with segment 12) has been binded to the care-of address such as the Foreign Agent's IP address (associated with segment 14).

Now, suppose that Mobile Node 6 wishes to send a message to a Correspondent Node 18 from its new location. An output message from the Mobile Node is then packetized and forwarded through Foreign Agent 10 over the internet 4 to Correspondent Node 18 (as indicated by the dotted line "packet from MN") according to a standard Internet Protocol. If Correspondent Node 18 wishes to send a message to Mobile Node—whether in reply to a message from the Mobile Node or for any other reason—it addresses that message to the IP address of Mobile Node 6 on sub-network 12. The packets of that message are then forwarded over the internet 4 and to router R1 and ultimately to Home Agent 8 as indicated by the dotted line ("packet to MN(1)"). From its mobility binding table, Home Agent 8 recognizes that Mobile Node 6 is no longer attached to network segment 12. It then encapsulates the packets from Correspondent Node 18 (which are addressed to Mobile Node 6 on network segment 12) according to a Mobile IP protocol and forwards these encapsulated packets to a "care of" address for Mobile Node 6 as shown by the dotted line ("packet to MN(2)"). The care-of address may be, for example, the IP address of Foreign Agent 10. Foreign Agent 10 then strips the encapsulation and forwards the message to Mobile Node 6 on sub-network 14. The packet forwarding mechanism implemented by the Home and Foreign Agents is often referred to as "tunneling."

As described above, when a Mobile Node registers with a Home Agent, it sends a registration request. Similarly, a Mobile Node sends a re-registration request when its lifetime nears expiration. Wireless link is a precious resource, since the frequency associated with the wireless link is limited in bandwidth.

In view of the above, it would be beneficial if the bandwidth of the wireless link could be optimized.

SUMMARY OF THE INVENTION

Methods and apparatus for compressing registration request and reply messages are disclosed. This is accomplished, in part, through enabling a Foreign Agent and/or Home Agent to interpret, process and generate compressed registration messages. In this manner, wireless link bandwidth may be optimized.

In accordance with one aspect of the invention, a compressed registration request is sent by a Mobile Node to a Foreign Agent. Communication with the Mobile Node is performed using compressed registration messages, while communication between a Foreign Agent and Home Agent is performed using standard registration request and reply formats. Thus, when a Foreign Agent receives a compressed registration request, it expands the registration request and sends it to the Home Agent for processing. Upon receipt of the registration reply from the Home Agent, the Foreign Agent compresses the registration reply and sends it to the Mobile Node.

In accordance with another aspect of the invention, a compressed registration request is sent by a Mobile Node to a Home Agent via a co-located care-of address. When a Mobile Node registers directly with the Home Agent via a co-located care-of address, the registration request and reply messages need not be expanded, since the Home Agent is capable of interpreting, processing and generating compressed registration messages. Thus, the Home Agent processes the compressed registration request and sends a compressed registration reply to the Mobile Node.

In accordance with yet another aspect of the invention, the Mobile Node sends an initial standard registration request in a standard format (e.g., in accordance with RFC 2002). The receiving Foreign Agent may then store this information to enable subsequent expansion of compressed registration request messages (used for re-registration of the Mobile Node). Similarly, it may be desirable for the Home Agent (in the case of registration via a co-located care-of address) to store information from the initial registration request message (e.g., to enable a compressed registration request message to be processed and a compressed registration reply message to be generated).

In accordance with yet another aspect of the invention, the Mobile Node may ascertain that the Foreign Agent or Home Agent (in the case of registration via a co-located care-of address) can interpret compressed registration request messages. In accordance with one embodiment, the Foreign Agent sends an agent advertisement indicating that the Foreign Agent can understand compressed registration messages. In accordance with another embodiment, the Home Agent informs the Mobile Node that it can understand compressed registration messages by information provided in a registration reply sent in response to an initial registration request message. This information may be provided, for instance, in an extension to the registration reply message.

In accordance with yet another aspect of the invention, a compressed registration message may include an NAI index rather than an NAI. This NAI index may be provided to the Mobile Node (e.g., in a registration reply) by a Foreign Agent after receipt of an initial registration request. Alternatively, the NAI index may be provided to the Mobile Node by a Home Agent (in the case of registration via a co-located care-of address) in a registration reply sent to the Mobile Node in response to the initial registration request. For instance, the NAI index may be provided in an extension to the registration reply. In this manner, the number of bits used to identify the Mobile Node may be reduced.

Various network devices may be configured or adapted for intercepting, generating, modifying, and transmitting packets to implement the disclosed functionality. These network devices include, but are not limited to, servers (e.g., hosts), routers, and switches. Moreover, the functionality for the above-mentioned virtualization processes may be implemented in software as well as hardware.

Yet another aspect of the invention pertains to computer program products including machine-readable media on which are provided program instructions for implementing the methods and techniques described above, in whole or in part. Any of the methods of this invention may be represented, in whole or in part, as program instructions that can be provided on such machine-readable media. In addition, the invention pertains to various combinations and arrangements of data generated and/or used as described herein. For example, packets having the format described herein and provided on appropriate media are part of this invention.

These and other features of the present invention will be described in more detail below in the detailed description of the invention and in conjunction with the following figures.

DETAILED DESCRIPTION OF THE PREFERRED EMBODIMENTS

In the following description, numerous specific details are set forth in order to provide a thorough understanding of the present invention. It will be obvious, however, to one skilled in the art, that the present invention may be practiced without some or all of these specific details. In other instances, well known process steps have not been described in detail in order not to unnecessarily obscure the present invention.

Figure 1:
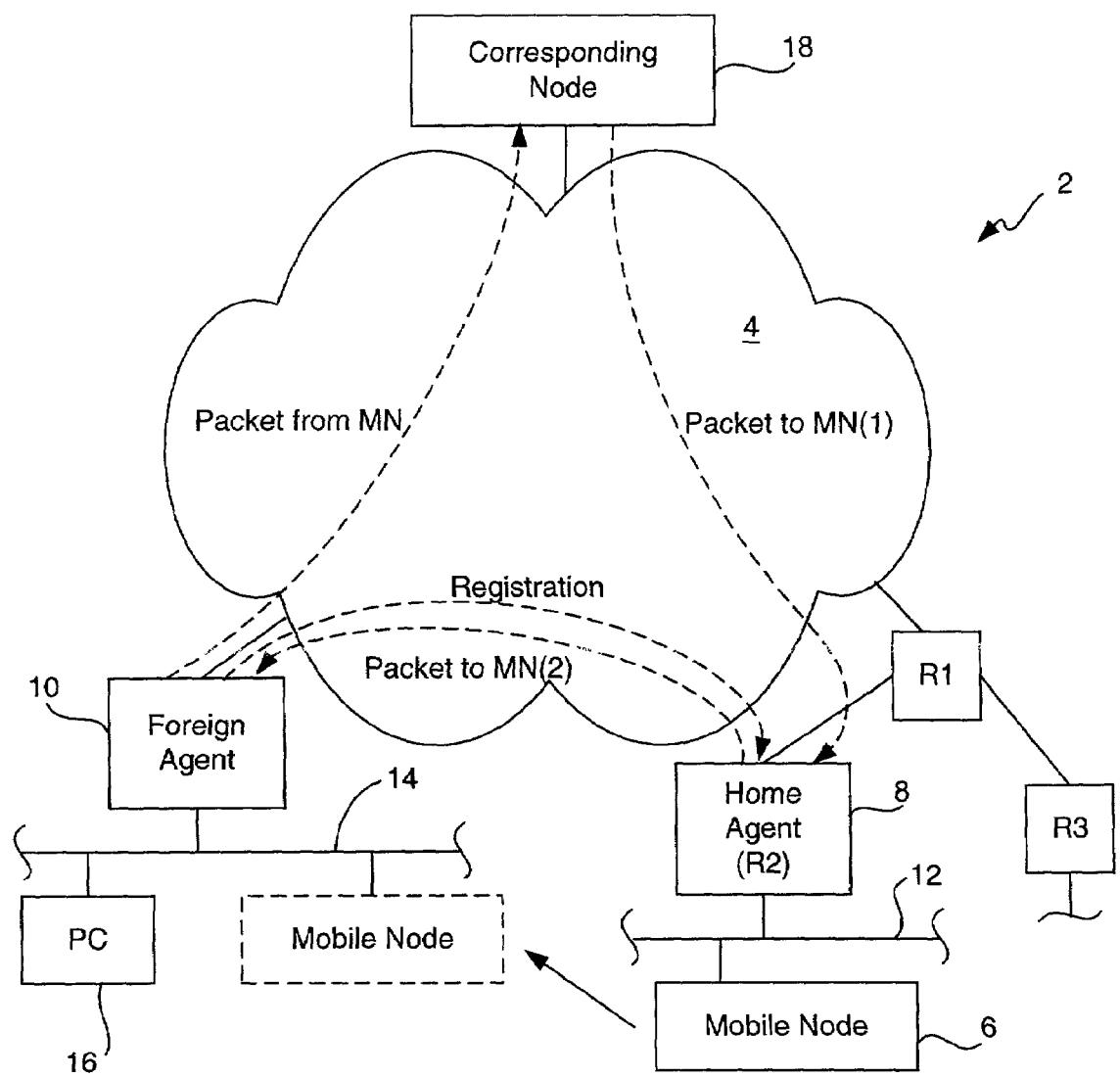
FIG. 1 is a diagram of a Mobile IP network segment and associated environment.
Figure 2:
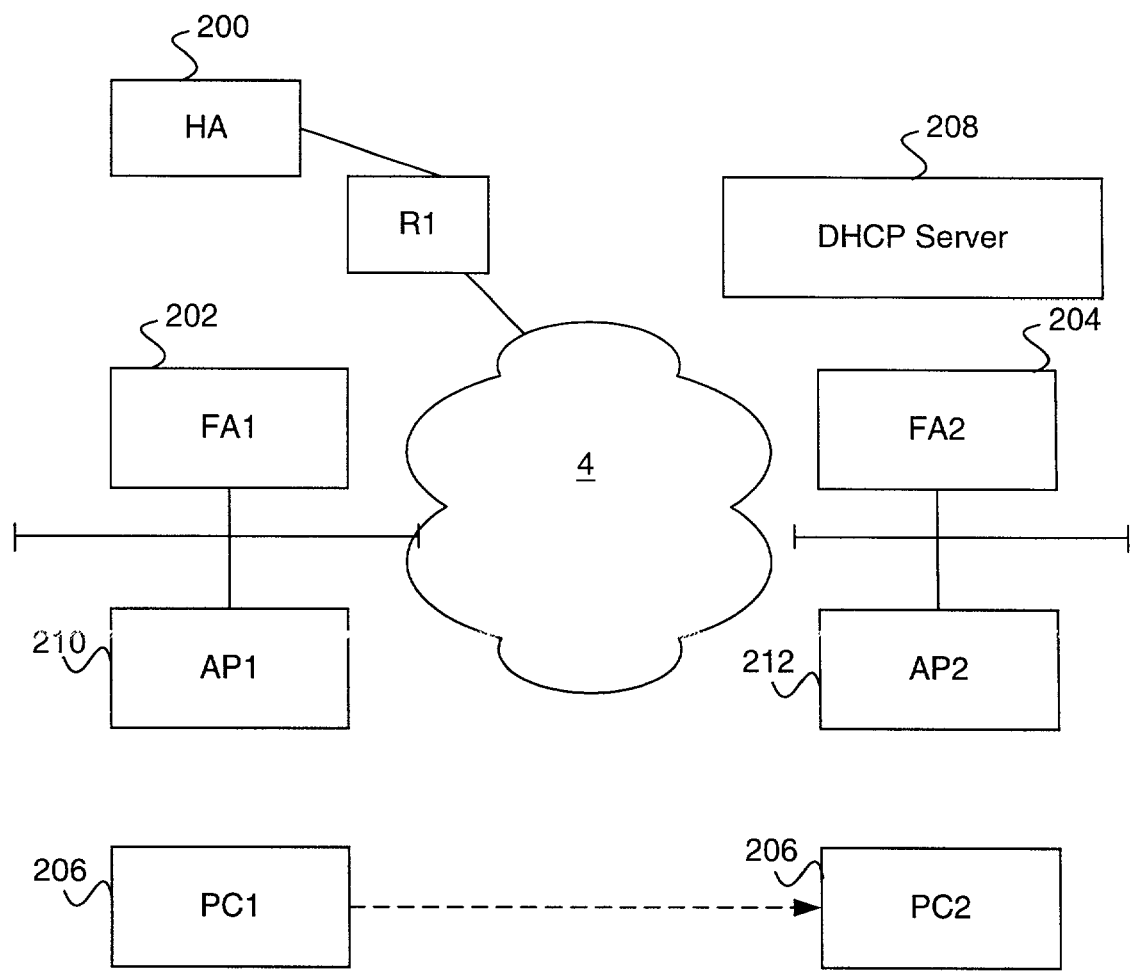
FIG. 2 is a block diagram illustrating an exemplary system in which the present invention may be implemented.

FIG. 2 is a block diagram illustrating a system in which the present invention may be implemented. In the following description, the present invention is implemented in a wireless network. However, although the present invention is described as being implemented in a wireless network, the present invention may also be implemented in a non-wireless network. As shown, a node 206 may wish to roam from its Home Agent 200 to a first Foreign Agent 202. Similarly, once attached to the first Foreign Agent 202, the node 206 may again wish to roam to a second Foreign Agent 204. Although the node 206 may have an assigned IP address, when the node 206 roams, it is preferable for the node to maintain this assigned IP address. For instance, although a DHCP server 208 typically dynamically assigns a new IP address to a node when its location within a network has changed, it is preferable to maintain the IP address originally assigned to the node by the DHCP server 208.

In a wireless network, Access Points 210 and 212 are coupled to the Foreign Agents 202 and 204. By way of example, in a wireless network, the Access Points 210 and 212 may have an antenna and receiver for receiving packets. As yet another example, the Access Points 210 and 212 may designate connection points in a non-wireless network. Typically, a mobile node implementing Mobile IP registers and de-registers with its Home Agent through the registration process. For instance, node 206 that has roamed to the first Foreign Agent 202 is registered with the node's Home Agent 200 when the first Foreign Agent 202 receives and forwards a registration request packet. Thus, the first Foreign Agent's visitor table and the Home Agent's mobility binding table are updated to indicate that the node has roamed to the first Foreign Agent 202. When the node 206 roams to the second Foreign Agent 204, the node 206 is de-registered (e.g., by either of the Foreign Agents 202, 204 or the Home Agent 200). In other words, the first Foreign Agent 202 updates its visitor table to reflect the movement of the node 206. Similarly, the Home Agent's mobility binding table is updated to reflect the movement of the node 206 to the second Foreign Agent 204. Thus, the appropriate entry in the first Foreign Agent's visitor table and the Home Agent's mobility binding table may be deleted. A new entry is then entered in the Home Agent's mobility binding table and the second Foreign Agent's visitor table upon completion of registration of the mobile node with the Home Agent.

As described above, when a node that is roaming wishes to send a message to a corresponding node from its new location, a message from the roaming node is packetized and forwarded through the Foreign Agent it is visiting over the internet and to the corresponding node. However, the node may have been configured for use of a particular Foreign Agent or default gateway. Thus, when the node roams, it is desirable to redirect packets sent by the node to the appropriate Foreign Agent. In accordance with one embodiment, the access point is responsible for such redirection of packets.

In accordance with various embodiments of the invention, registration request and reply messages may be compressed to reduce precious wireless link usage. This is possible since there are many fields which remain the same after initial registration is completed. The reduction in the size of registration request and reply messages will therefore result in a substantial reduction in the use of wireless link. The savings will become evident in the following examples described with reference to FIG. 3 through FIG. 6.

Figure 3:
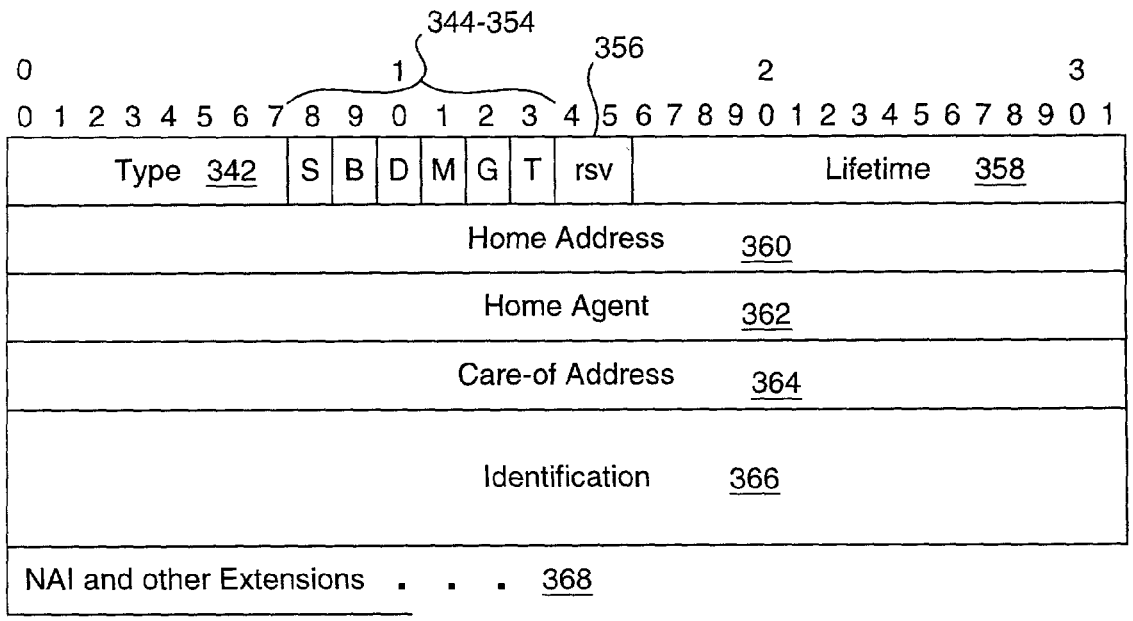
FIG. 3 is a diagram illustrating an exemplary registration request that may be sent by a mobile node as an initial registration request in accordance with various embodiments of the invention.

FIG. 3 is a diagram illustrating an exemplary registration request that may be sent by a mobile node in accordance with an embodiment of the invention. The registration request packet 302 includes a Fixed-Length Portion 340 of the Registration Request which includes the Mobile IP Fields as provided in RFC 3220. RFC 3220, C. Perkins, Ed., January 2002, "IP Mobility Support for IPv4," which replaces RFC 2002, is incorporated herein by reference for all purposes. As shown, the Fixed-Length Portion 340 includes multiple fields. A Type field 342 identifies the message as either a Registration Request or a Registration Reply. In addition, the mobile node sets an S bit 344 to 1 to ask that its home agent create or delete a binding for the specified care-of address without affecting any other existing bindings.

B, D, M, G, and T bits provide information required for routing of the registration request packet 302. A B bit 346 is set to 1 by a mobile node to request that the home agent provide it a copy of broadcast packets that occur on the home link. A D bit 348 informs the home agent which entity is performing decapsulation. The D bit 348 is set to 1 for a collocated care-of address and is set to 0 for a foreign agent care-of address. An M bit 350 and a G bit 352 request that the home agent use minimal encapsulation [RFC 2004] or generic routing encapsulation [RFC 1701] respectively, instead of IP in IP encapsulation [RFC 2003] for tunneling. A T bit 354 is used to request a reverse tunnel to the care-of address. In addition, an rsv field 356 typically includes several bits that are reserved for future use.

The remaining fields provide information that may be used during registration of the mobile node. The mobile node sets lifetime field 358 to the number of seconds it would like its registration to last before it expires. In addition, a Mobile Node's Home Address 360 and Home Agent Address 362 are specified. Care-of Address field 364 is set to the specific care-of address being registered or deregistered by the mobile node. In addition, an Identification field 366 is chosen to be unique for each attempted registration. The Identification field 366 permits the mobile node to match Registration Requests with the corresponding Replies. This prevents an outsider from saving a copy of the Registration Request and resending it at a later time.

The registration request may include one or more extensions 368. For instance, a Network Access Identifier (NAI) may be transmitted in an NAI extension. One standardized method for identifying users is proposed in RFC 2486 of the Network Working Group, January 1999, hereby incorporated by reference, which proposes syntax for the Network Access Identifier (NAI), the userID submitted by a client during Point to Point Protocol (PPP) authentication. Similarly, RFC 2794, "Mobile IP Network Access Identifier Extension for IPv4P," Calhoun et al, March 2000, which discloses the use of the NAI in a Mobile IP registration request, is incorporated herein by reference for all purposes. Thus, when a client is authenticated based upon the NAI, an IP address may be allocated for use by the client.

As one example, for a registration request with NAI john.chambers@cisco.com and Mobile Node-Home Agent Authentication Extension (MHAE), the size is 24 bytes for the fixed-length portion of the registration request packet, 25 bytes for the NAI, and 22 bytes for the MHAE, which results in a total of 71 bytes. In order to optimize the use of wireless link, the compressed registration request message comprises a subset of fields in a standard registration request. Fields for which values typically do not change throughout the registration process for a particular Mobile Node include the bit flags, lifetime, Home Address, care-of address, and NAI. Accordingly, these fields may be removed from the compressed registration request message.

Figure 4:
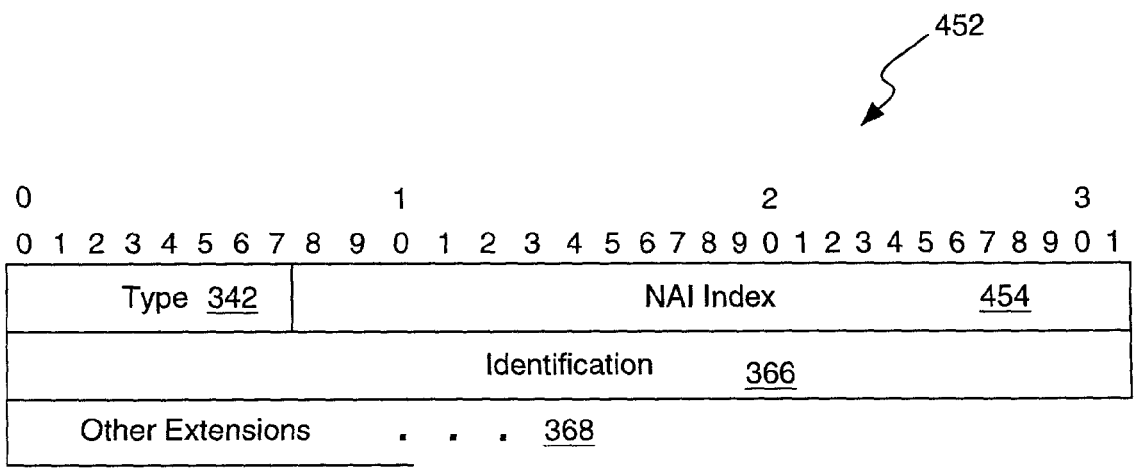
FIG. 4 is a diagram illustrating an exemplary compressed registration request composed and sent in accordance with various embodiments of the invention.

Since values for multiple fields do not change, these fields may be removed, resulting in a "compressed" registration request message. FIG. 4 is a diagram illustrating an exemplary compressed registration request composed 452 sent in accordance with various embodiments of the invention. A Type field 342 identifies the message as either a Registration Request or a Registration Reply. Alternatively, the Type field 342 may be used to designate the message as a compressed Registration Request or compressed Registration Reply. In addition, a NAI index field 454 may be used to transmit an NAI index corresponding to an NAI for the Mobile Node. The NAI index may be transmitted, for instance, by the Home Agent (when the Mobile Node registers via a co-located care-of address) or the Foreign Agent (when the Mobile Node registers via the Foreign Agent care-of address). In addition, as described above, the Identification field 366 is chosen to be unique for each attempted registration. This prevents an outsider from saving a copy of the Registration Request and resending it at a later time. The compressed registration request may also include one or more extensions 368 as transmitted in the initial Registration Request.

As can be seen from the example illustrated in FIG. 4, the fields of the compressed registration request include 12 bytes for the type, NAI index, and identification fields. The MHAE extension uses 22 bytes. Thus, the total number of bytes for the compressed registration request is 34 bytes. Thus, 34 bytes rather than 71 bytes are used for a particular registration request message sent over an airlink to register the client's point of attachment to its Home Agent, resulting in approximately 52% savings.

Figures 5, 6:
FIG. 5 is a diagram illustrating an exemplary registration reply that may be sent by a Home Agent in accordance with various embodiments of the invention.
FIG. 6 is a diagram illustrating an exemplary compressed registration reply composed and sent in accordance with various embodiments of the invention.

FIG. 5 is a diagram illustrating a registration reply having a Home Address ID extension that may be sent by a Home Agent in accordance with an embodiment of the invention. As shown, the fixed length portion 402 of the registration reply includes a Type field 404 that identifies the message as either a Registration Request (1) or a Registration Reply (3). In addition, a Code field 406 tells the mobile node whether its attempted registration was accepted or rejected. A Lifetime field 408 in the registration reply tells the mobile node how long the registration lasts before it expires. In addition, the registration reply includes the mobile node's Home Address 410 and the Home Agent Address 412. The Identification field 414 is chosen by the mobile node to be unique for each registration. This allows the mobile node to match Registration Requests with the corresponding Registration Replies. In addition, this may be used to prevent a third party from capturing the registration request and replaying it at a later time. Similarly to the registration request, the registration reply may include one or more extensions 418.

Referring to the above example, for a registration reply with NAI john.chambers@cisco.com and Mobile Node-Home Agent Authentication Extension (MHAE), the size is 20 bytes for the fixed-length portion of the registration request packet, 25 bytes for the NAI, and 22 bytes for the MHAE, which results in a total of 67 bytes. In order to optimize the use of wireless link, the compressed registration reply message comprises a subset of fields in a standard registration request. Fields for which values typically do not change throughout the registration process for a particular Mobile Node include the Code, Lifetime, Home Address, Home Agent address, Identification, and NAI. Accordingly, these fields may be "removed" from the compressed registration reply message.

In order to optimize the use of wireless link, the compressed registration reply message comprises a subset of fields in a standard registration reply. More specifically, various fields are removed from the registration reply, resulting in a "compressed" registration reply message. FIG. 6 is a diagram illustrating an exemplary compressed registration reply 602 composed and sent in accordance with various embodiments of the invention. As shown, the fixed length portion 402 of the registration reply includes a Type field 404 that identifies the message as either a Registration Request (1) or a Registration Reply (3). Alternatively, the Type field 404 may be used to designate the message as a compressed Registration Request or compressed Registration Reply. In addition, a NAI index field 604 may be used to transmit an NAI index corresponding to an NAI for the Mobile Node. The compressed registration reply may include one or more extensions 418.

As can be seen from the example illustrated in FIG. 6, the fields of the compressed registration reply include 4 bytes for the type and NAI index fields. The MHAE extension uses 22 bytes. Thus, the total number of bytes for the compressed registration reply is 26 bytes. Thus, 26 bytes rather than 67 bytes are used for a particular registration reply message sent over an airlink, resulting in approximately 61% savings.

Depending upon whether a Mobile Node registers via a Foreign Agent, the Foreign Agent or Home Agent may perform various compression steps. More specifically, as will be described below with reference to FIG. 7, when the Mobile Node registers with its Home Agent via a Foreign Agent, the Foreign Agent performs various compression and expansion steps. However, when the Mobile Node registers via a co-located care-of address, the Home Agent receives, processes and generates various compressed registration messages, as will be described below with reference to FIG. 8

Figure 7:
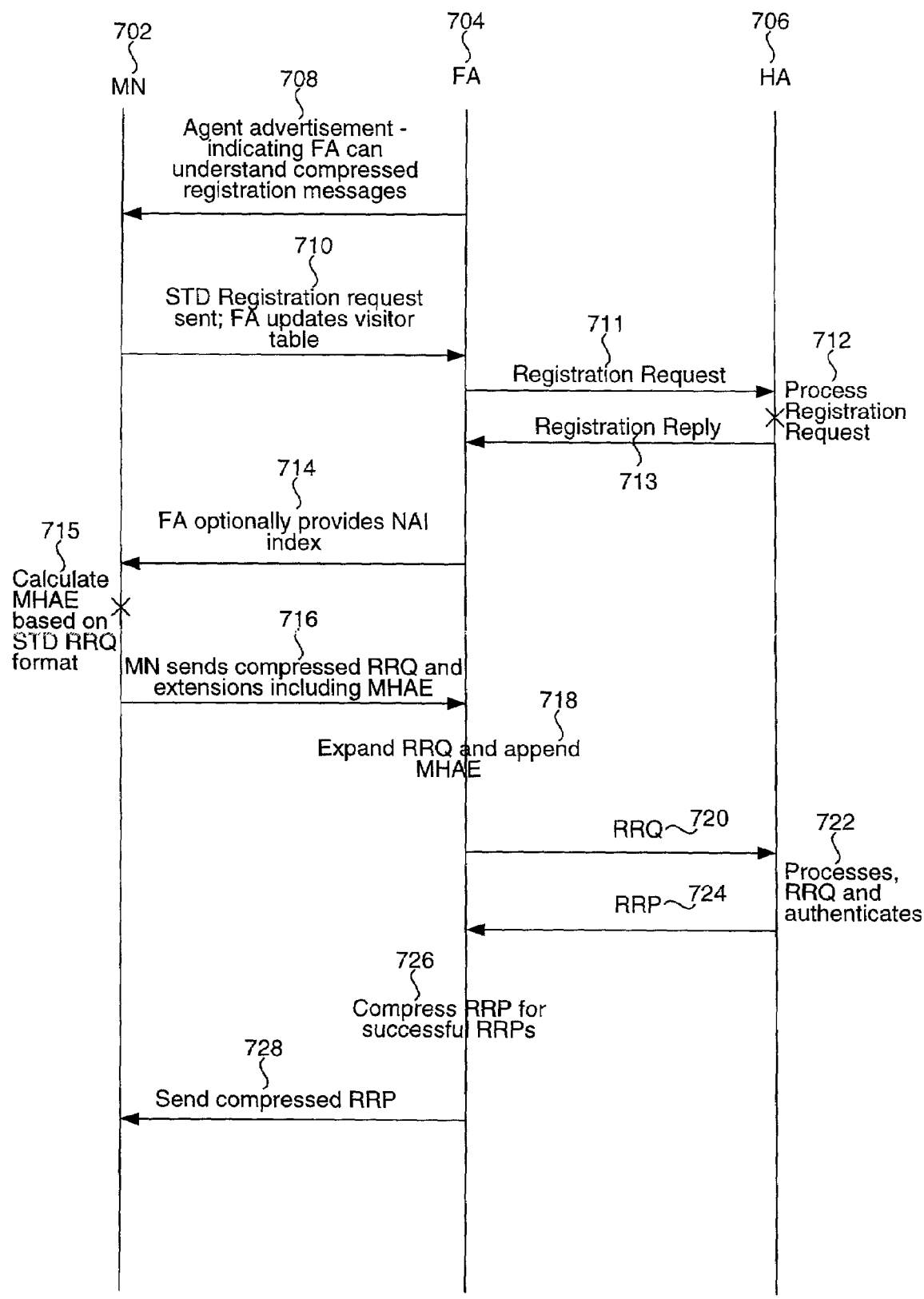
FIG. 7 is a control flow diagram illustrating a method of processing a registration request via a Foreign Agent in accordance with various embodiments of the invention.

FIG. 7 is a control flow diagram illustrating a method of processing a registration request via a Foreign Agent in accordance with various embodiments of the invention. Processes performed by the Mobile Node, Foreign Agent, and Home Agent are represented by vertical lines 702, 704, and 706, respectively. Since not all Foreign Agents will understand compressed messages, the Foreign Agent sends an agent advertisement at 708 indicating that the Foreign Agent can interpret compressed registration request messages. The Mobile Node may then send a standard registration request message at 710 to the Foreign Agent, which may then update its visitor table accordingly to indicate that the Mobile Node is visiting it. For instance, the Foreign Agent may store a NAI or IP address associated with the Mobile Node as well as its Home Agent. In addition, other information from additional fields in the registration request may be stored in the visitor table or other data structure. This stored information may subsequently be used for expansion of compressed registration request messages.

The Foreign Agent then forwards the registration request at 711 to the Home Agent. The Home Agent processes the registration request according to RFC 3220 at 712, updating its mobility binding table to indicate that the Mobile Node has roamed to the Foreign Agent. The Home Agent then composes and sends a registration reply at 713 to the Foreign Agent.

If the Mobile Node does not receive such an agent advertisement message from the Foreign Agent indicating that it is capable of understanding compressed registration messages, the Mobile Node may send its registration request message to an alternate Foreign Agent. Alternatively, the Mobile Node may send its message to the Foreign Agent, which may then reject the subsequent compressed registration request message via an error message.

Since the NAI transmitted by the Mobile Node uses a large number of bits, the Foreign Agent may provide an NAI index at 714 to the Mobile Node. For instance, the NAI index may be provided in a registration reply sent to the Mobile Node in response to the initial registration request.

Thus, when the Mobile Node "compresses" a standard registration request to compose a compressed registration request, the NAI index may be provided in the compressed registration request, as described above with reference to FIG. 4, rather than transmitting the entire NAI in an extension to the registration request. The Foreign Agent therefore maps the NAI index to the NAI. The compressed registration request will include a subset of the fields of the standard registration request, as described above with reference to the exemplary compressed registration request illustrated in FIG. 4. As described above with reference to FIG. 4, the type field of the compressed registration request may indicate that the packet is a compressed registration request (rather than a standard registration request).

In order to authenticate the Mobile Node, the Mobile Node appends a Mobile-Home Authentication Extension (MHAE) to its registration request. In accordance with one embodiment, the Mobile Node calculates the MHAE based upon the standard registration request format (such as that described above with reference to FIG. 3) as shown at 715. This MHAE may then be appended to a compressed registration request message, enabling the expanded registration request message to be authenticated by a Home Agent. When the Mobile Node has composed its compressed registration request including one or more extensions, it appends the calculated MHAE to the compressed registration request and sends the compressed registration request at 716 to the Foreign Agent.

When the Foreign Agent receives the compressed registration request, it "expands" the compressed registration request to a standard registration request format and appends the MHAE at 718. More specifically, the compressed registration request is expanded through obtaining the previously stored information from the initial standard registration request, in addition to the fields in the compressed registration request. The Foreign Agent then sends the standard registration request to a Home Agent supporting the Mobile Node at 720, as specified by the Home Agent field in the initial registration request.

When the Home Agent receives the registration request, it processes the registration request and authenticates the Mobile Node according to RFC 3220 at 722 and sends a registration reply at 724 to the Foreign Agent. The Foreign Agent compresses the registration reply at 726 to a format such as that described above with reference to FIG. 6 and sends the compressed registration reply at 728 to the Mobile Node. As described above with reference to FIG. 6, the type field of the compressed registration reply may indicate that the packet is a compressed registration reply. Moreover, the compressed registration reply includes a subset of fields in the standard registration reply. In accordance with one embodiment, the registration reply is compressed for successful registrations (e.g., when the registration reply received at 724 from the Home Agent indicates that registration is successful).

Upon receipt of the compressed registration reply from the Foreign Agent, the Mobile Node may process the compressed registration reply. Alternatively, it may expand the compressed registration reply with information previously stored from its initial registration request prior to processing the registration reply. The Mobile Node may then receive data packets via the Foreign Agent upon successful registration with its Home Agent.

Figure 8:
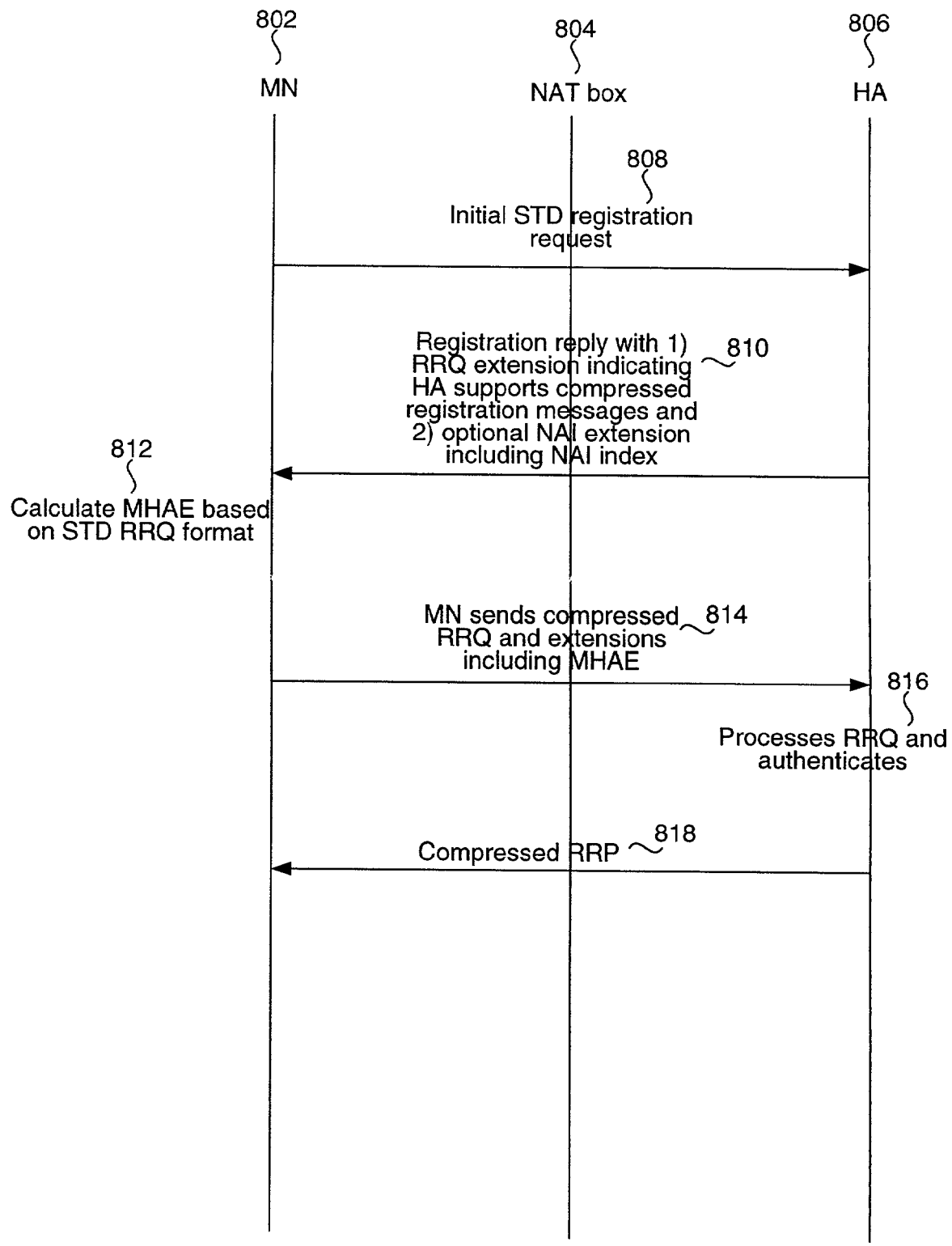
FIG. 8 is a control flow diagram illustrating a method of processing a registration request via a co-located care-of address in accordance with various embodiments of the invention.

FIG. 8 is a control flow diagram illustrating a method of processing a registration request via a co-located care-of address in accordance with various embodiments of the invention. Steps performed by the Mobile Node 802 and Home Agent 806 with respect to a Network Address Translation (NAT) box 804 are illustrated with respect to corresponding vertical lines, as shown. The Mobile Node sends an initial standard registration request at 808 to its Home Agent via its co-located care-of address. The Home Agent performs steps similar to those performed by the Foreign Agent as described above with reference to FIG. 7. More specifically, the Home Agent stores information from the initial standard registration request. For instance, values for one or more fields of the standard registration request initially received from the Mobile Node may be stored in a table such as its Mobility Binding Table (MBT), which will enable the Home Agent to subsequently expand a compressed registration request received from the Mobile Node. Typically, a MBT is used to store a care-of address associated with a Mobile Node, thereby enabling a Home Agent to forward data packets to the Mobile Node at its current location.

The Home Agent then sends a registration reply at 810 to the Mobile Node. The registration reply may indicate that the Home Agent can understand compressed registration messages, as well as provide an NAI index. For instance, the registration reply may include a registration request extension that indicates whether the Home Agent can understand compressed registration messages. As another example, the registration reply may include a NAI index extension which may carry the NAI.

In accordance with one embodiment, the Mobile Node calculates the MHAE based on the standard registration request format at 812, compresses the registration request and appends the MHAE to the compressed registration request, which is sent at 814 to the Home Agent via a co-located care-of address. The type field of the compressed registration request may indicate that the message is a compressed registration request (rather than a registration request having a standard format). Alternatively, since the Home Agent can authenticate a compressed message, the Mobile Node may calculate the MHAE based upon the compressed message. As described above, the compressed registration request includes a subset of the fields of the initial standard registration request, may include the NAI index, and also may include one or more additional extensions.

The Home Agent processes the registration request pursuant to RFC 2002 and authenticates the Mobile Node using the MHAE at 816. The Home Agent then composes a compressed registration reply and sends the compressed registration reply at 818 to the Mobile Node via the co-located care-of address. The compressed registration reply includes a subset of the fields of a standard registration reply, as described above with reference to FIG. 6. In accordance with one embodiment, the Home Agent obtains information previously stored information from the initial registration request as well as information from the compressed registration request to compose the compressed registration reply. The type field of the compressed registration reply may indicate that the type of the packet is a compressed registration reply (rather than a registration reply having a standard format). As described above with reference to FIG. 7, the compressed registration reply may be composed and sent when the Home Agent determines that registration is successful (e.g., the Mobile Node has been authenticated using the MHAE). The compressed registration reply may also include one or more extensions.

OTHER EMBODIMENTS

Generally, the techniques of the present invention may be implemented on software and/or hardware. For example, they can be implemented in an operating system kernel, in a separate user process, in a library package bound into network applications, on a specially constructed machine, or on a network interface card. In a specific embodiment of this invention, the technique of the present invention is implemented in software such as an operating system or in an application running on an operating system.

A software or software/hardware hybrid implementation of the techniques of this invention may be implemented on a general-purpose programmable machine selectively activated or reconfigured by a computer program stored in memory. Such a programmable machine may be a network device designed to handle network traffic, such as, for example, a router or a switch. Additionally, such a programmable machine may be used to implement a Mobile Node. Such network devices may have multiple network interfaces including frame relay and ISDN interfaces, for example. Specific examples of such network devices include routers and switches. For example, the Home Agents and Foreign Agents of this invention may be implemented in specially configured routers, switches or servers such as specially configured router models 1600, 2500, 2600, 3600, 4500, 4700, 7200, 7500, and 12000 available from Cisco Systems, Inc. of San Jose, Calif. A general architecture for some of these machines will appear from the description given below. In an alternative embodiment, the techniques of this invention may be implemented on a general-purpose network host machine such as a personal computer or workstation. Further, the invention may be at least partially implemented on a card (e.g., an interface card) for a network device or a general-purpose computing device.

Figure 9:
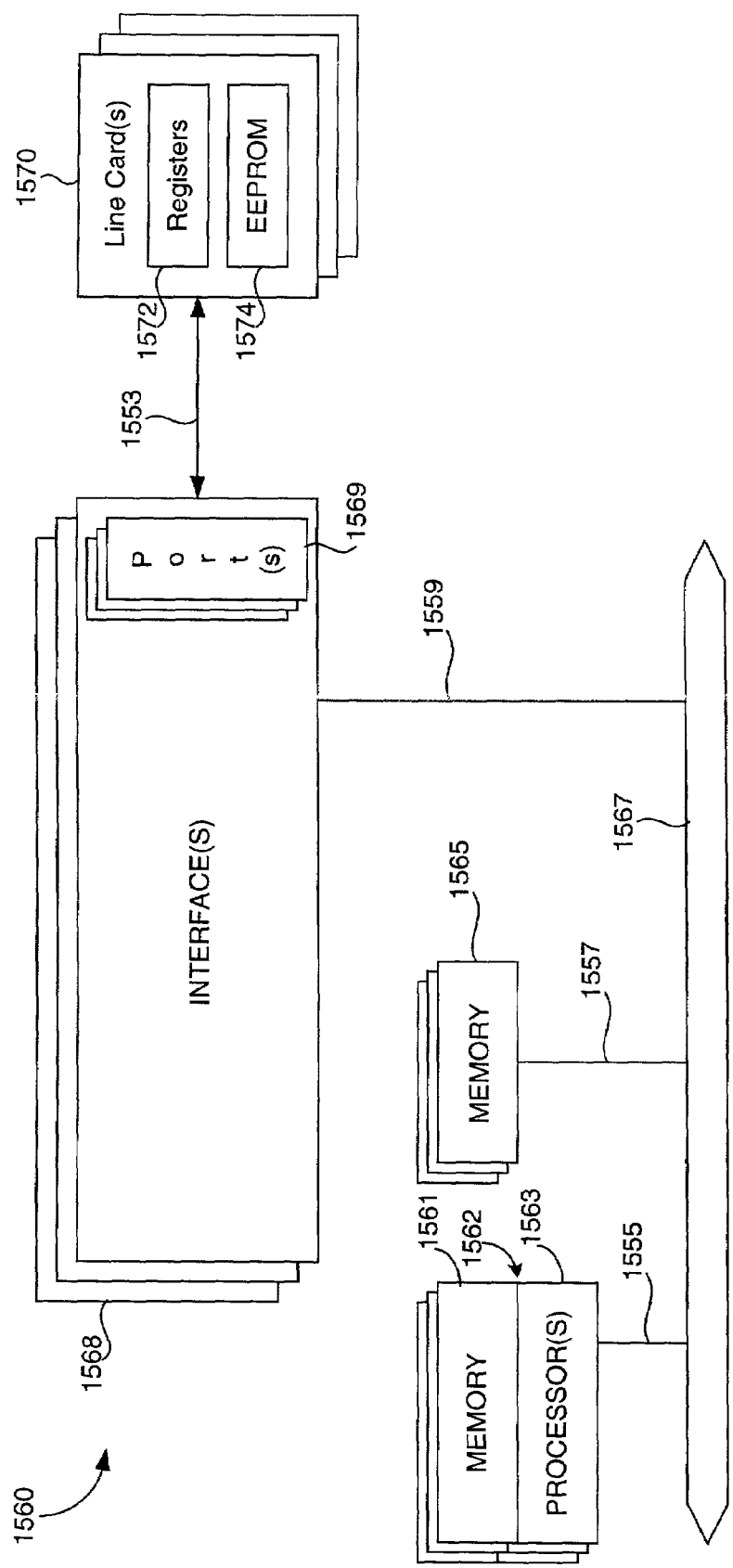
FIG. 9 is a diagram illustrating an exemplary network device in which embodiments of the invention may be implemented.

Referring now to FIG. 9, a network device 1560 suitable for implementing the techniques of the present invention includes a master central processing unit (CPU) 1562, interfaces 1568, and a bus 1567 (e.g., a PCI bus). When acting under the control of appropriate software or firmware, the CPU 1562 may be responsible for implementing specific functions associated with the functions of a desired network device. For example, when configured as an intermediate router, the CPU 1562 may be responsible for analyzing packets, encapsulating packets, and forwarding packets for transmission to a set-top box. The CPU 1562 preferably accomplishes all these functions under the control of software including an operating system (e.g. Windows NT), and any appropriate applications software.

CPU 1562 may include one or more processors 1563 such as a processor from the Motorola family of microprocessors or the MIPS family of microprocessors. In an alternative embodiment, processor 1563 is specially designed hardware for controlling the operations of network device 1560. In a specific embodiment, a memory 1561 (such as non-volatile RAM and/or ROM) also forms part of CPU 1562. However, there are many different ways in which memory could be coupled to the system. Memory block 1561 may be used for a variety of purposes such as, for example, caching and/or storing data, programming instructions, etc.

The interfaces 1568 are typically provided as interface cards (sometimes referred to as "line cards"). Generally, they control the sending and receiving of data packets over the network and sometimes support other peripherals used with the network device 1560. Among the interfaces that may be provided are Ethernet interfaces, frame relay interfaces, cable interfaces, DSL interfaces, token ring interfaces, and the like. In addition, various very high-speed interfaces may be provided such as fast Ethernet interfaces, Gigabit Ethernet interfaces, ATM interfaces, HSSI interfaces, POS interfaces, FDDI interfaces, ASI interfaces, DHEI interfaces and the like. Generally, these interfaces may include ports appropriate for communication with the appropriate media. In some cases, they may also include an independent processor and, in some instances, volatile RAM. The independent processors may control such communications intensive tasks as packet switching, media control and management. By providing separate processors for the communications intensive tasks, these interfaces allow the master microprocessor 1562 to efficiently perform routing computations, network diagnostics, security functions, etc.

Although the system shown in FIG. 9 illustrates one specific network device of the present invention, it is by no means the only network device architecture on which the present invention can be implemented. For example, an architecture having a single processor that handles communications as well as routing computations, etc. is often used. Further, other types of interfaces and media could also be used with the network device.

Regardless of network device's configuration, it may employ one or more memories or memory modules (such as, for example, memory block 1565) configured to store data, program instructions for the general-purpose network operations and/or other information relating to the functionality of the techniques described herein. The program instructions may control the operation of an operating system and/or one or more applications, for example.

Because such information and program instructions may be employed to implement the systems/methods described herein, the present invention relates to machine readable media that include program instructions, state information, etc. for performing various operations described herein. Examples of machine-readable media include, but are not limited to, magnetic media such as hard disks, floppy disks, and magnetic tape; optical media such as CD-ROM disks; magneto-optical media such as floptical disks; and hardware devices that are specially configured to store and perform program instructions, such as read-only memory devices (ROM) and random access memory (RAM). The invention may also be embodied in a carrier wave travelling over an appropriate medium such as airwaves, optical lines, electric lines, etc. Examples of program instructions include both machine code, such as produced by a compiler, and files containing higher level code that may be executed by the computer using an interpreter.

Although illustrative embodiments and applications of this invention are shown and described herein, many variations and modifications are possible which remain within the concept, scope, and spirit of the invention, and these variations would become clear to those of ordinary skill in the art after perusal of this application. In addition, the above-described invention may be stored on a disk drive, a hard drive, a floppy disk, a server computer, or a remotely networked computer. Accordingly, the present embodiments are to be considered as illustrative and not restrictive, and the invention is not to be limited to the details given herein, but may be modified within the scope and equivalents of the appended claims.

What is claimed is:

1. In a Mobile Node, a method of registering with a Home Agent supporting the Mobile Node, comprising:
   compressing a standard registration request to compose a compressed registration request;
   sending the compressed registration request;

receiving a compressed registration reply in response to the compressed registration request;
calculating a Mobile Node-Home Agent Authentication Extension; and
appending the calculated Mobile Node-Home Agent Authentication Extension to the compressed registration request;
wherein sending the compressed registration request comprises sending the compressed registration request including the calculated Mobile Node-Home Agent Authentication Extension.

2. The method as recited in claim 1, wherein the compressed registration reply is received when registration is successful.

3. The method as recited in claim 1, wherein calculating a Mobile Node-Home Agent Authentication Extension comprises:
calculating the Mobile Node-Home Agent Authentication Extension based on the standard registration request.

4. The method as recited in claim 1, wherein calculating a Mobile Node-Home Agent Authentication Extension comprises:
calculating the Mobile Node-Home Agent Authentication Extension based on the compressed registration request.

5. The method as recited in claim 1, further comprising:
sending a standard registration request prior to sending the compressed registration request.

6. The method as recited in claim 1, further comprising:
receiving a Network Access Identifier index;
wherein the compressed registration request includes the Network Access Identifier index.

7. The method as recited in claim 1, wherein the compressed registration request comprises a subset of fields in the standard registration request.

8. The method as recited in claim 1, wherein the compressed registration reply comprises a subset of fields in a standard registration reply.

9. The method as recited in claim 1, wherein sending the compressed registration request comprises sending the compressed registration request to a Home Agent via a co-located care-of address and receiving the compressed registration reply comprises receiving the compressed registration reply from the Home Agent via the co-located care-of address.

10. In a Mobile Node, a method of registering with a Home Agent supporting the Mobile Node, comprising:
compressing a standard registration request to compose a compressed registration request;
sending the compressed registration request;
receiving a compressed registration reply in response to the compressed registration request;
receiving an agent advertisement from a Foreign Agent indicating that the Foreign Agent can interpret compressed registration request messages prior to sending the compressed registration request;
wherein sending the compressed registration request comprises sending the compressed registration request to the Foreign Agent and receiving the compressed registration reply comprises receiving the compressed registration reply from the Foreign Agent.

11. In a Mobile Node, a method of registering with a Home Agent supporting the Mobile Node, comprising:
compressing a standard registration request to compose a compressed registration request;
sending the compressed registration request;
receiving a compressed registration reply in response to the compressed registration request;
sending a standard registration request to a Home Agent; and
receiving a standard registration reply from the Home Agent, the standard registration reply indicating that the Home Agent can understand compressed registration request messages;
wherein sending the compressed registration request comprises sending the compressed registration request to the Home Agent via a co-located care-of address and receiving the compressed registration reply comprises receiving the compressed registration reply from the Home Agent via the co-located care-of address.

12. The method as recited in claim 11, wherein the standard registration reply includes a Network Access Identifier index and wherein the compressed registration request comprises the Network Access Identifier index.

13. The method as recited in claim 12, wherein the standard registration reply includes an extension including the Network Access Identifier index.

14. A Mobile Node adapted for registering with a Home Agent supporting the Mobile Node, comprising:
means for compressing a standard registration request to compose a compressed registration request;
means for calculating a Mobile Node-Home Agent Authentication Extension;
means for appending the calculated Mobile Node-Home Agent Authentication Extension to the compressed registration request;
means for sending the compressed registration request including the calculated Mobile Node-Home Agent Authentication Extension; and
means for receiving a compressed registration reply in response to the compressed registration request.

15. A Mobile Node adapted for registering with a Home Agent supporting the Mobile Node, comprising:
a processor; and
a memory, at least one of the processor or the memory being adapted for:
compressing a standard registration request to compose a compressed registration request;
calculating a Mobile Node-Home Agent Authentication Extension;
appending the calculated Mobile Node-Home Agent Authentication Extension to the compressed registration request;
sending the compressed registration request including the calculated Mobile Node-Home Agent Authentication Extension; and
receiving a compressed registration reply in response to the compressed registration request.

16. A computer-readable medium storing thereon computer-readable instructions for registering with a Mobile Node with a Home Agent supporting the Mobile Node, comprising:
instructions for compressing a standard registration request to compose a compressed registration request;
instructions for calculating a Mobile Node-Home Agent Authentication Extension;
instructions for appending the calculated Mobile Node-Home Agent Authentication Extension to the compressed registration request;
instructions for sending the compressed registration request including the calculated Mobile Node-Home Agent Authentication Extension; and instructions for receiving a compressed registration reply in response to the compressed registration request.

17. In a Foreign Agent supporting Mobile IP, a method of processing a registration request, comprising:
- receiving a compressed registration request from a Mobile Node;
- expanding the compressed registration request to compose a standard registration request;
- sending the standard registration request to a Home Agent supporting the Mobile Node;
- receiving a standard registration reply from the Home Agent supporting the Mobile Node;
- compressing the standard registration reply to compose a compressed registration reply;
- sending the compressed registration reply to the Mobile Node;
- receiving a standard registration request from the Mobile Node prior to receiving the compressed registration request from the Mobile Node; and
- storing information from one or more fields of the standard registration request in a table, thereby enabling the Foreign Agent to expand a compressed registration request from the Mobile Node.

18. The method as recited in claim 17, further comprising:
- sending an agent advertisement prior to receiving the compressed registration request from the Mobile Node, the agent advertisement indicating that the Foreign Agent can interpret compressed registration request messages.

19. The method as recited in claim 17, wherein the table is a visitor table.

20. The method as recited in claim 17, wherein expanding the compressed registration request to compose a standard registration request comprises:
- obtaining the stored information; and
- composing the standard registration request from fields in the compressed registration request and the obtained stored information.

21. The method as recited in claim 17, wherein the compressed registration request includes a Mobile Node-Home Agent Authentication Extension calculated based on the standard registration request received from the Mobile Node.

22. The method as recited in claim 17, wherein compressing the standard registration reply to compose a compressed registration reply and sending the compressed registration reply to the Mobile Node are performed when the standard registration reply indicates that registration is successful.

23. The method as recited in claim 17, wherein compressing the standard registration reply to compose a compressed registration reply comprises:
- composing the compressed registration reply such that the compressed registration reply includes a subset of fields in the standard registration reply.

24. The method as recited in claim 17, further comprising:
- providing a Network Access Identifier index to the Mobile Node;
- wherein the compressed registration request includes the Network Access Identifier index.

25. In a Foreign Agent supporting Mobile IP, a method of processing a registration request, comprising:
- receiving a compressed registration request from a Mobile Node;
- expanding the compressed registration request to compose a standard registration request;
- sending the standard registration request to a Home Agent supporting the Mobile Node;
- receiving a standard registration reply from the Home Agent supporting the Mobile Node;
- compressing the standard registration reply to compose a compressed registration reply; and
- sending the compressed registration reply to the Mobile Node;
- wherein the compressed registration request includes a Mobile Node-Home Agent Authentication Extension calculated based on a standard registration request format.

26. The method as recited in claim 25, wherein expanding the compressed registration request comprises:
- appending the Mobile Node-Home Agent Authentication Extension calculated based on a standard registration request format to the composed standard registration request.

27. The method as recited in claim 25, wherein the compressed registration request comprises one or more extensions and the standard registration request comprises the one or more extensions.

28. The method as recited in claim 25, wherein the compressed registration reply comprises one or more extensions and the standard registration reply comprises the one or more extensions.

29. In a Foreign Agent supporting Mobile IP, a method of processing a registration request, comprising:
- receiving a compressed registration request from a Mobile Node;
- expanding the compressed registration request to compose a standard registration request;
- sending the standard registration request to a Home Agent supporting the Mobile Node;
- receiving a standard registration reply from the Home Agent supporting the Mobile Node;
- compressing the standard registration reply to compose a compressed registration reply; and
- sending the compressed registration reply to the Mobile Node;
- wherein a type field of the compressed registration request indicates that the packet is a compressed registration request.

30. In a Foreign Agent supporting Mobile IP, a method of processing a registration request, comprising:
- receiving a compressed registration request from a Mobile Node;
- expanding the compressed registration request to compose a standard registration request;
- sending the standard registration request to a Home Agent supporting the Mobile Node;
- receiving a standard registration reply from the Home Agent supporting the Mobile Node;
- compressing the standard registration reply to compose a compressed registration reply; and
- sending the compressed registration reply to the Mobile Node;
- wherein compressing the standard registration reply to compose a compressed registration reply comprises:
  - providing a type field of the compressed registration reply, the type field indicating that the packet is a compressed registration reply.

31. A Foreign Agent supporting Mobile IP and adapted for processing a registration request, comprising:
- means for receiving a compressed registration request from a Mobile Node;
- means for expanding the compressed registration request to compose a standard registration request;
- means for sending the standard registration request to a Home Agent supporting the Mobile Node;

means for receiving a standard registration reply from the Home Agent supporting the Mobile Node;

means for compressing the standard registration reply to compose a compressed registration reply;

wherein the means for compressing the standard registration reply to compose a compressed registration reply includes providing a type field of the compressed registration reply, the type field indicating that the packet is a compressed registration reply; and means for sending the compressed registration reply to the Mobile Node.

32. A Foreign Agent supporting Mobile IP and adapted for processing a registration request, comprising:

a processor; and a memory, at least one of the processor or and the memory being adapted for:

receiving a compressed registration request from a Mobile Node;

expanding the compressed registration request to compose a standard registration request;

sending the standard registration request to a Home Agent supporting the Mobile Node;

receiving a standard registration reply from the Home Agent supporting the Mobile Node;

compressing the standard registration reply to compose a compressed registration reply;

wherein compressing the standard registration reply to compose a compressed registration reply includes providing a type field of the compressed registration reply, the type field indicating that the packet is a compressed registration reply; and sending the compressed registration reply to the Mobile Node.

33. A computer-readable medium storing thereon computer-readable instructions for processing a registration request in a Foreign Agent supporting Mobile IP, comprising:

instructions for receiving a compressed registration request from a Mobile Node;

instructions for expanding the compressed registration request to compose a standard registration request;

instructions for sending the standard registration request to a Home Agent supporting the Mobile Node;

instructions for receiving a standard registration reply from the Home Agent supporting the Mobile Node;

instructions for compressing the standard registration reply to compose a compressed registration reply;

wherein the instructions for compressing the standard registration reply to compose a compressed registration reply include instructions for providing a type field of the compressed registration reply, the type field indicating that the packet is a compressed registration reply; and instructions for sending the compressed registration reply to the Mobile Node.

34. In a Home Agent supporting Mobile IP, a method of processing a registration request, comprising:

receiving a compressed registration request from a Mobile Node;

processing the compressed registration request to authenticate the Mobile Node;

composing a compressed registration reply;

sending the compressed registration reply to the Mobile Node;

receiving a standard registration request from the Mobile Node prior to receiving the compressed registration request from the Mobile Node; and storing information from one or more fields of the standard registration request in a table, thereby enabling the Home Agent to expand a compressed registration request from the Mobile Node.

35. The method as recited in claim 34, further comprising:

sending a standard registration reply to the Mobile Node, the standard registration reply having an extension indicating that the Home Agent can interpret compressed registration request messages prior to receiving the compressed registration request.

36. The method as recited in claim 35, wherein the standard registration reply includes a Network Access Identifier index and wherein the compressed registration request comprises the Network Access Identifier index.

37. The method as recited in claim 36, wherein the standard registration reply includes an extension including the Network Access Identifier index.

38. The method as recited in claim 34, wherein the compressed registration request comprises a subset of fields in the standard registration request.

39. The method as recited in claim 34, wherein the compressed registration request includes a Mobile Node-Home Agent Authentication Extension calculated based on the standard registration request received from the Mobile Node.

40. The method as recited in claim 34, wherein the table is a mobility binding table.

41. The method as recited in claim 34, further comprising:

obtaining the stored information; and composing the compressed registration reply from at least one of fields in the compressed registration request and the obtained stored information.

42. The method as recited in claim 34, wherein composing and sending the compressed registration reply to the Mobile Node are performed when the Home Agent determines that registration is successful.

43. The method as recited in claim 34, wherein composing a compressed registration reply comprises:

composing the compressed registration reply such that the compressed registration reply includes a subset of fields in a standard registration reply.

44. The method as recited in claim 34, further comprising:

providing a Network Access Identifier index to the Mobile Node;

wherein the compressed registration request includes the Network Access Identifier index.

45. In a Home Agent supporting Mobile IP, a method of processing a registration request, comprising:

receiving a compressed registration request from a Mobile Node;

processing the compressed registration request to authenticate the Mobile Node;

composing a compressed registration reply; and sending the compressed registration reply to the Mobile Node wherein the compressed registration request includes a Mobile Node-Home Agent Authentication Extension calculated based on the compressed registration request.

46. The method as recited in claim 45, wherein the compressed registration request comprises one or more extensions.

47. The method as recited in claim 45, wherein the compressed registration reply comprises one or more extensions.

48. In a Home Agent supporting Mobile IP, a method of processing a registration request, comprising:
- receiving a compressed registration request from a Mobile Node;
- processing the compressed registration request to authenticate the Mobile Node;
- composing a compressed registration reply; and
- sending the compressed registration reply to the Mobile Node;

wherein a type field of the compressed registration request indicates that the packet is a compressed registration request.

49. In a Home Agent supporting Mobile IP, a method of processing a registration request, comprising:
- receiving a compressed registration request from a Mobile Node;
- processing the compressed registration request to authenticate the Mobile Node;
- composing a compressed registration reply; and
- sending the compressed registration reply to the Mobile Node;

wherein composing a compressed registration reply comprises:
- providing a type field of the compressed registration reply, the type field indicating that the packet is a compressed registration reply.

50. The method as recited in claim 49, wherein the compressed registration reply comprises a subset of fields of a standard registration reply.

51. A Home Agent supporting Mobile IP and adapted for processing a registration request, comprising:
- means for receiving a compressed registration request from a Mobile Node;
- means for processing the compressed registration request to authenticate the Mobile Node;
- means for composing a compressed registration reply, wherein the means for composing a compressed registration reply includes providing a type field of the compressed registration reply the type field indicating that the packet is a compressed registration reply; and
- means for sending the compressed registration reply to the Mobile Node.

52. A Home Agent supporting Mobile IP and adapted for processing a registration request, comprising:
- a processor; and
- a memory, at least one of the processor or the memory being adapted for:
- receiving a compressed registration request from a Mobile Node;
- processing the compressed registration request to authenticate the Mobile Node;
- composing a compressed registration reply, wherein composing a compressed registration reply includes providing a type field of the compressed registration reply, the type field indicating that the packet is a compressed registration reply; and
- sending the compressed registration reply to the Mobile Node.

53. A computer-readable medium storing thereon computer-readable instructions for processing a registration request in a Home Agent supporting Mobile IP, comprising:
- instructions for receiving a compressed registration request from a mobile node;
- instructions for processing the compressed registration request to authenticate the mobile node;
- instructions for composing a compressed registration reply, wherein composing a compressed registration reply includes providing a type field of the compressed registration reply, the type field indicating that the packet is a compressed registration reply; and
- instructions for sending the compressed registration reply to the Mobile Node.

* * * * *